United States Patent [19]

Darchambeau

[11] Patent Number: 4,931,180
[45] Date of Patent: Jun. 5, 1990

[54] SELF CLEANING FILTERING APPARATUS

[75] Inventor: Alain Darchambeau, Orleans, France

[73] Assignee: Combustion Engineering Europe, France

[21] Appl. No.: 270,799

[22] Filed: Nov. 14, 1988

[30] Foreign Application Priority Data

Nov. 25, 1987 [FR] France ................... 87 16332

[51] Int. Cl.⁵ ............................................. B01D 29/64
[52] U.S. Cl. ..................................... 210/414; 210/415; 210/451
[58] Field of Search ............... 210/413, 414, 415, 451, 210/498

[56] References Cited

U.S. PATENT DOCUMENTS

| 3,093,579 | 6/1963 | Schmidt | 210/415 |
| 3,762,563 | 10/1973 | Petersen | 210/415 |
| 3,997,441 | 12/1976 | Pamplin, Jr. | 210/415 |
| 4,098,182 | 7/1978 | Rasmus | 210/415 |
| 4,276,159 | 6/1981 | Lehman | 210/415 |
| 4,818,402 | 4/1989 | Steiner et al. | 210/413 |

FOREIGN PATENT DOCUMENTS

| 0187553 | 11/1984 | European Pat. Off. . |
| 2629848 | 2/1976 | Fed. Rep. of Germany . |
| 61-278314 | 3/1985 | Japan . |
| 61-207689 | 9/1986 | Japan . |
| 12251 | of 1900 | United Kingdom . |

Primary Examiner—Peter Hruskoci
Assistant Examiner—Christopher Upton
Attorney, Agent, or Firm—Stevens, Davis, Miller & Mosher

[57] ABSTRACT

A self-cleaning filtering apparatus is provided comprising a body with an inner filtering basket communicating with an intake duct for the product to be filtered and a drain for discharging waste and forming, with the body, a peripheral space communicating with an outlet duct for the filtrate. Rotary scrapers clean the inside of the basket. The peripheral space communicates with the filtrate outlet duct through an annular restriction.

7 Claims, 2 Drawing Sheets

SELF CLEANING FILTERING APPARATUS

BACKGROUND OF THE INVENTION

The present invention relates to a self-cleaning filtering apparatus for filtering a product to be filtered, comprising a body, an inner filtering basket communicating with an inlet duct for the product to be filtered and a drain for discharging waste and forming, with the body, a peripheral space communicating with an outlet duct for the filtrate, scrapers being adapted to be rotated inside the basket to clean it.

The applications of such an apparatus are numerous, not to say universal, and it is met with in most transformation industries where it is necessary for example to filter solvents, adhesives, glues, polymers, emulsions, sludges, resins, paints, varnishes, grains, tars, pigments, detergents, food products, etc..

It is also met with in the paper-making industry and particularly as a coating sauce which is a liquid of medium viscosity (1000 to 2000 cp). It was by considering this particular application that the Applicant raised the problem which is at the basis of the invention of the present application. This application will therefore be described in greater detail. However, the Applicant does not intend limiting the scope of his application for all that, the description of this particular application being given for purely pedagogic reasons. The invention applies to products of any viscosity.

Crude paper does not make perfect printing by inking possible, because of the uneven and absorbent nature of its surface. It is then necessary to eliminate the unevennesses, to stop up the pores and give the paper an appropriate appearance For this, the crude paper is coated with a coating sauce, which is a liquid of medium viscosity, in a station of the paper-making machine situated between the rollers for drying the crude paper and the station for drying the coated paper.

Before being introduced into the conditioner, the coating sauce is first of all stirred in vats and filtered through a vibrating strainer, so that it is considerably mixed with air; the impurities of the air are often more prejudicial than the solid impurities.

An object of the invention is then to eliminate the air bubbles from the product to be filtered as much as possible.

SUMMARY OF THE INVENTION

For this the present invention relates to a filtering apparatus of the above mentioned type, characterized by the fact that said peripheral space communicates with the filtrate outlet duct through an annular restriction.

Because of this annular restriction, the peripheral space is slightly pressurized, so that the pressure gradient on each side of the basket is reduced. The risk of clogging of the filtering basket and the deposition of solid impurities on its inner wall is thus also reduced. The result is that the air bubbles trapped in the product to be filtered, and following the action of the scrapers, have a better chance of swelling evenly and without destructive deformation and rising along the inner wall of the basket before being discharged at the upper part.

The restriction of the invention also has the advantage, with the reduction of the induced pressure gradient, of reducing the speed of the product passing through the filtering basket, which reduces the risk of clogging, the filtrate recovering a correct flow speed again through this restriction.

Further because of this restriction for discharging the filtrate, the overpressure which prevails in the peripheral zone serves as stirring means and no special means need therefore be provided for stirring the filtrate. Furthermore, this overpressure prevents the filtrate from remaining too long in this zone.

In the preferred embodiment of the filtering apparatus of the invention, the filtering basket comprises a plurality of columns, spaced apart from each other, of horizontal filtering slits. The dead zones, between two adjacent columns of filtering slits, thus prevent the scrapers from carrying the impurities to the whole periphery of the basket, which thus further reduces the risk of clogging.

Advantageously, the section of the slits of the filtering basket comprise, on the upstream side, a filtering chimney and, on the downstream side, a cleaning bell mouth.

BRIEF DESCRIPTION OF THE DRAWINGS

The invention will be better understood from the following description of a preferred embodiment of the filtering apparatus of the invention, with reference to the accompanying drawings in which.

DESCRIPTION OF THE PREFERRED EMBODIMENT

Figure 1:
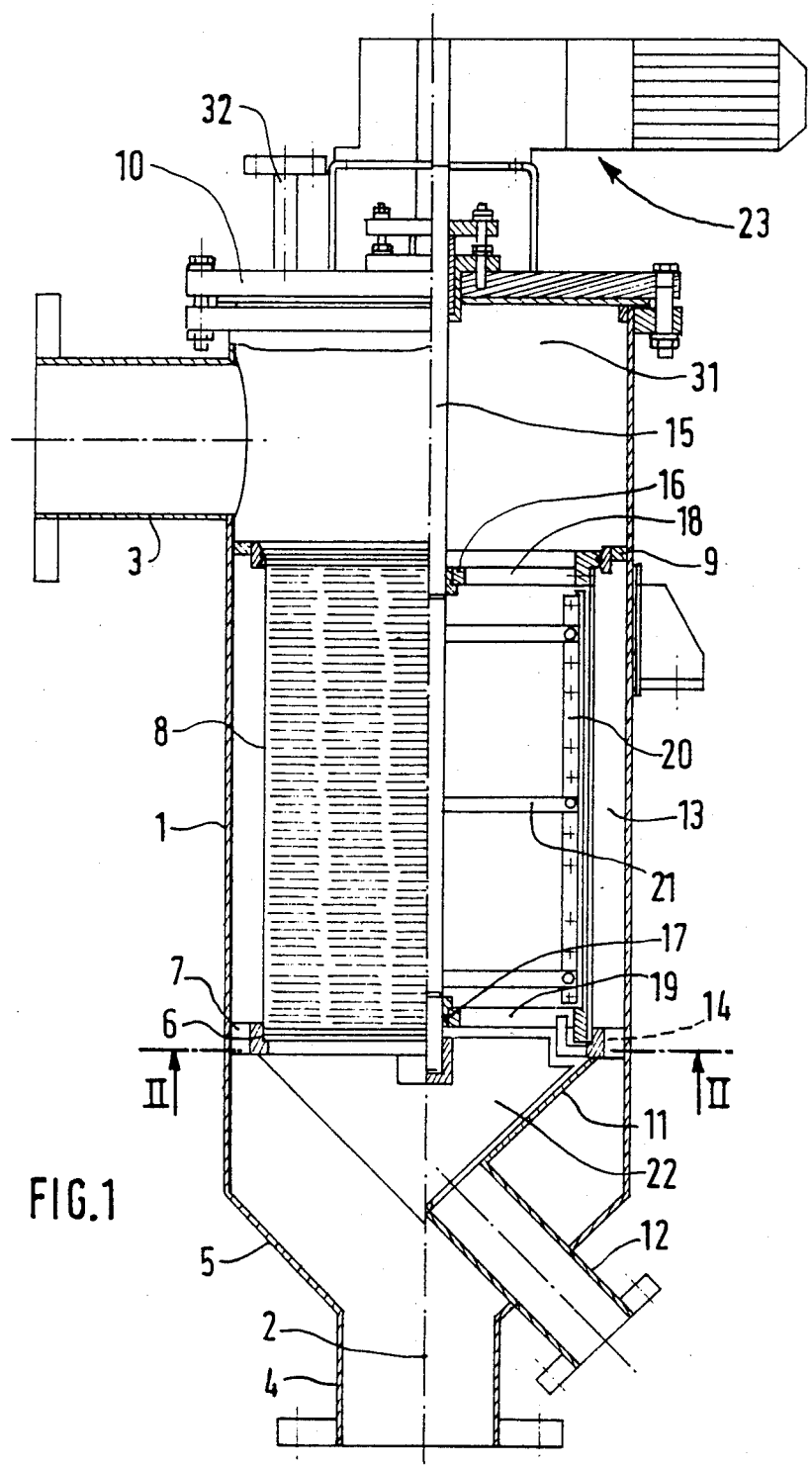
FIG. 1 is an axial half sectional view of the apparatus of the invention.
Figure 2:
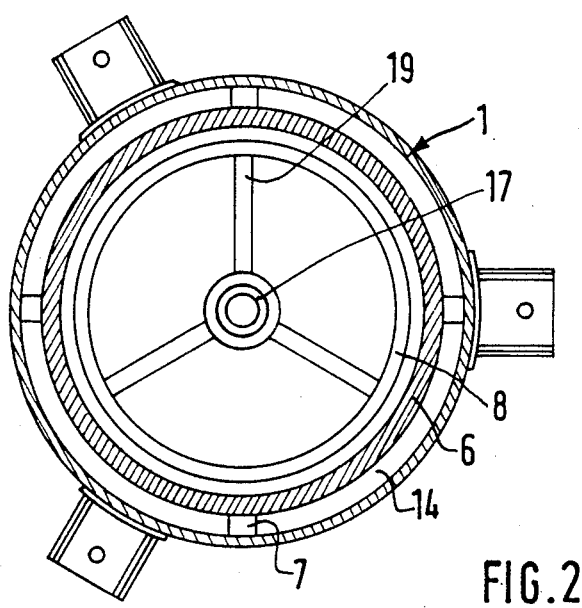
FIG. 2 is a cross sectional view of the apparatus through line II—II of FIG. 1.
Figure 3:
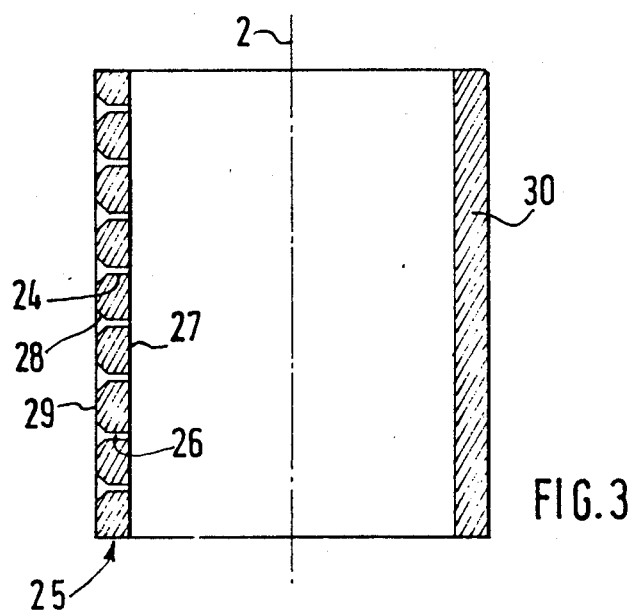
FIG. 3 is an axial sectional view of the filtering basket of the apparatus of the invention.

The apparatus comprises a cylindrical body or case 1 with axis 2, having an intake duct 3, opening laterally or radially into the top part of the case, and an axial outlet duct 4 in the low part, connected to the straight cylindrical portion of the case by a frustro-conical skirt 5.

A circular support ring 6 is fixed, by lugs 7, to the internal wall of the case in the lower part of the case, but at a level substantially higher than that of the connection of the frustro-conical skirt 5. On this support ring 6 the lower edge of a filtering basket 8 is fixed via a seal. The upper edge of basket 8 is held in position, at the top part, via a seal, against another ring 9 also fixed, but directly, to the internal wall of the case.

The case is closed by a lid 10 at its upper part.

Under the lower support ring 6 is sealingly fixed a frustro-conical hopper 11, from which extends a discharge drain 12 passing through the frustro-conical skirt 5.

The lower support ring 6 has an external diameter smaller than the diameter of the internal wall of case 1, having substantially the radial dimension of lugs 7, this radial dimension of lugs 7 is smaller than the radial width of the peripheral annular space 13 formed between case 1 and basket 8. The support ring 6 and case 1 thus form an annular restriction 14 in the lower portion of the peripheral zone 13.

The filtering basket 8 thus communicates, at the top, with an intake duct 3 through the space formed in the case between lid 10 and basket 8, forming a decompression chamber 31 and, at the bottom, with the discharge drain 12 through the hopper 11. The peripheral zone 13 communicates with the outlet duct 4 through the annular restriction 14.

A drive shaft 15 extends along axis 2, passes through lid 10 and is held in position in two bearings 16, 17 fitted respectively to the upper and lower edges of basket 8 by radial arms 18, 19. Shaft 15 has, in the axial zone of basket 8, two pairs of scraper blades 20 fixed thereto by arms 21 and, in the axial zone of the hopper 11, a triangular stirring vane 22. Shaft 15 may be rotated by a motor driven reducing unit 23, fixed to the lid of the case.

The filtering basket 8 is formed, apart from the framework 18,19 supporting the bearings of shaft 15, of a screen formed of a thick sheet, here made from stainless steel, rolled up and closed on itself edge to edge, to form a cylinder with axis Z. Columns 25 of elongate slits 24, orthogonal to axis 2, are machined through the screen sheet. The axial section of each slit comprises, on the upstream side, a filtering chimney 26 extending from the internal wall 27 of the screen and a cleaning bell mouth 28 opening on to the external wall 29 of the screen. The columns 25 of slits are spaced angularly apart so as to form therebetween solid vertical strips 30 forming dead zones.

The structure of the filtering apparatus having been thus described, it operation will now be explained.

The product to be filtered, for example a coating sauce, sucked up from a vat by a pump which delivers it, arrives through the intake duct 3 in the decompression chamber 31 of the apparatus, before penetrating into the inner volume of basket 8. The filtrate passes through the screen through slits 24 before flowing through the peripheral zone 13, the annular restriction 14 and the outlet duct 4. The impurities are discharged, through hopper 22, by drain 12. The filtrate is fed, in the above mentioned case, into the tank of a coating machine.

Because of the surface tension prevailing at the edges of the filtering slits 24, these edges are covered with a film of the product to be filtered called "buttering" in the jargon of the trade, which advantageously reduces the opening of the slits. Because of the presence of the decompression chamber 31, this film is not destroyed and the quality of the filtrate is preserved.

The impurities trapped by the filtering slits 24, through the action of the rotating scrapers 20, are driven to one of the ends of the slits, as far as the adjacent dead zone 30. The air bubbles then rise in the apparatus before being discharged at the upper part through a blow-off 32. The impurities which are heavier than the product to be filtered fall into hopper 11 before being discharged by drain 12. The rotating stirring vane 22 prevents the solidification, the sedimentation and/or the fermentation of the waste.

Because of the shape of slits 24, the surface film is not destroyed and no clogging occurs, the downstream bell mouth 28 reducing the pressure. This pressure is increased in the peripheral zone 13 because of the annular restriction 14. The result is a relatively low pressure gradient on each side of the screen or the filtering basket 8, with the advantages clearly set forth above.

Inside the filtering basket, the product to be filtered is stirred by scraping. Outside the basket, in the peripheral zone, the filtrate is stirred by overpressure.

The flow of the filtrate is slowed down on passing through the filtering screen, but it is accelerated on passing through the annular restriction, where it recovers the correct speed.

It will be noted that, if the pressure increases unexpectedly at the inlet of the filtering circuit, it is inside the filtering basket that the pressure increases and that the basket may perfectly withstand the increase in the pressure gradient on each side of the filtering screen which results therefrom; in other words, the basket better withstands a tendency to explosion than a tendency to implosion.

The filtering apparatus which has just been described is self-cleaning, without requiring counter-current washing and it eliminates relatively fine particles. It may operate continuously, without appreciable maintenance costs.

I claim:

1. A self-cleaning apparatus for filtering a liquid comprising:
    a body having a liquid inlet duct at one end thereof and a filtrate outlet duct at another end thereof;
    a filtering basket disposed within said body and communicating with said inlet duct to receive therein a liquid to be filtered;
    at least one rotatable scraper provided within said basket for cleaning said basket;
    a drain for discharging waste from the interior of said basket, said basket being connected to said drain through a frustro-conical hopper having at least one stirring vane mounted therein;
    said basket forming, with said body, a peripheral annular space having a radial width and communicating with said outlet duct through an annular opening having a radial width smaller than the radial width of said peripheral annular space, said annular opening being located between said body and said basket, said annular opening forming an annular restriction for reducing the flow and increasing the velocity of liquid passing therethrough towards said outlet duct;
    said body further including a frusto-conical skirt located between said annular opening and said outlet duct.

2. The apparatus as claimed in claim 1, wherein said annular opening is formed by and between said body and a ring supporting said filtering basket.

3. The apparatus as claimed in claim 2, wherein said supporting ring is secured to the body by lugs.

4. The apparatus as claimed in claim 1, wherein the filtering basket comprises a plurality of columns, spaced apart from each other, of horizontal filtering slits.

5. The apparatus as claimed in claim 4, wherein said slits comprise a filtering chimney on the upstream side thereof and a cleaning bell mouth on the downstream side thereof.

6. The apparatus as claimed in claim 1 wherein said apparatus is constructed and arranged to filter viscous liquids having a viscosity in the range between 1,000 and 2,000 cp.

7. The apparatus as claimed in claim 1 wherein the height of said basket through which a liquid passes is larger than the interior diameter of said inlet duct and said outlet duct.

* * * * *